США009886736B2

(12) United States Patent
Perelygin et al.

(10) Patent No.: US 9,886,736 B2
(45) Date of Patent: Feb. 6, 2018

(54) SELECTIVELY KILLING TRAPPED MULTI-PROCESS SERVICE CLIENTS SHARING THE SAME HARDWARE CONTEXT

(71) Applicant: NVIDIA Corporation, Santa Clara, CA (US)

(72) Inventors: Kyrylo Perelygin, Santa Clara, CA (US); Vivek Kini, Sunnyvale, CA (US); Vyas Venkataraman, Santa Clara, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 0 days.

(21) Appl. No.: 14/481,802

(22) Filed: Sep. 9, 2014

(65) Prior Publication Data

US 2015/0206272 A1    Jul. 23, 2015

Related U.S. Application Data

(60) Provisional application No. 61/929,913, filed on Jan. 21, 2014, provisional application No. 61/929,496, filed on Jan. 20, 2014, provisional application No. 61/965,089, filed on Jan. 21, 2014.

(51) Int. Cl.
| | | |
|---|---|---|
| *G06T 1/00* | (2006.01) | |
| *G06T 1/20* | (2006.01) | |
| *G06F 12/109* | (2016.01) | |
| *G06T 1/60* | (2006.01) | |
| *G06F 9/50* | (2006.01) | |

(52) U.S. Cl.
CPC ............. *G06T 1/20* (2013.01); *G06F 9/5016* (2013.01); *G06F 12/109* (2013.01); *G06T 1/60* (2013.01)

(58) Field of Classification Search
CPC ...... G06F 9/3851; G06F 9/3861; G06F 9/485; G06F 9/3865; G06F 9/461; G06F 11/0751; G06F 9/30123
See application file for complete search history.

(56) References Cited

U.S. PATENT DOCUMENTS

| | | |
|---|---|---|
| 5,765,036 A | 6/1998 | Lim |
| 6,324,683 B1 | 11/2001 | Fuh et al. |
| 6,571,320 B1 | 5/2003 | Hachmann |
| 7,065,630 B1 | 6/2006 | Ledebohm et al. |
| 7,366,956 B2 | 4/2008 | Karp et al. |
| 7,516,446 B2 | 4/2009 | Choi et al. |
| 7,549,150 B2 | 6/2009 | Yu |
| 7,584,332 B2 | 9/2009 | Kogge et al. |

(Continued)

FOREIGN PATENT DOCUMENTS

| | | |
|---|---|---|
| WO | WO2006115769 | 11/2006 |

OTHER PUBLICATIONS

"Memory Management" (by WordPress in 2008).

(Continued)

Primary Examiner — Hau Nguyen

(57) ABSTRACT

A method for handling parallel processing clients associated with a server in a GPU, the method comprising: receiving a failure indication for at least client running a thread in the GPU; determining threads in the GPU associated with the failing client; exiting threads in the GPU associated with the failing client; and continuing to execute remaining threads in the GPU for other clients running threads in the GPU.

22 Claims, 5 Drawing Sheets

(56) References Cited

U.S. PATENT DOCUMENTS

| | | |
|---|---|---|
| 7,673,181 B1 | 3/2010 | Lindo et al. |
| 7,757,237 B2 | 7/2010 | Karp et al. |
| 7,992,146 B2 | 8/2011 | Krauss |
| 8,028,133 B2 | 9/2011 | Dice et al. |
| 8,095,750 B2 | 1/2012 | Heller, Jr. |
| 8,117,403 B2 | 2/2012 | Heller, Jr. et al. |
| 8,296,743 B2 | 10/2012 | Linderman et al. |
| 8,321,637 B2 | 11/2012 | Baum et al. |
| 8,375,368 B2 | 2/2013 | Tuck et al. |
| 8,448,156 B2 | 5/2013 | Demetriou et al. |
| 8,487,946 B2 | 7/2013 | Stauffer et al. |
| 9,563,571 B2 | 2/2017 | Kumar |
| 9,619,364 B2 | 4/2017 | Venkataraman |
| 2003/0131283 A1 | 7/2003 | Ur et al. |
| 2003/0210248 A1 | 11/2003 | Wyatt |
| 2005/0273570 A1 | 12/2005 | DeSouter et al. |
| 2005/0283781 A1 | 12/2005 | Karp et al. |
| 2006/0218553 A1 | 9/2006 | Dore et al. |
| 2006/0224858 A1* | 10/2006 | Wang ............... G06F 9/30043 711/202 |
| 2006/0259691 A1 | 11/2006 | Jeremiassen |
| 2007/0011671 A1 | 1/2007 | Kahlon et al. |
| 2008/0028181 A1 | 1/2008 | Tong et al. |
| 2008/0312095 A1 | 12/2008 | Kirovski et al. |
| 2010/0118041 A1 | 5/2010 | Chen et al. |
| 2010/0138376 A1 | 6/2010 | Avis et al. |
| 2010/0153934 A1 | 6/2010 | Lachner |
| 2010/0250809 A1 | 9/2010 | Ramesh et al. |
| 2011/0078427 A1* | 3/2011 | Shebanow ............... G06F 9/327 712/244 |
| 2011/0161619 A1 | 6/2011 | Kaminski et al. |
| 2011/0167412 A1 | 7/2011 | Kahlon et al. |
| 2011/0185359 A1 | 7/2011 | Chakrabarti |
| 2011/0314458 A1 | 12/2011 | Zhu et al. |
| 2012/0198178 A1 | 8/2012 | Cox et al. |
| 2012/0254497 A1 | 10/2012 | Ni et al. |
| 2013/0036408 A1 | 2/2013 | Auerbach et al. |
| 2013/0086564 A1 | 4/2013 | Felch |
| 2013/0262784 A1 | 10/2013 | Asaro et al. |
| 2013/0304996 A1 | 11/2013 | Venkataraman et al. |
| 2013/0305252 A1 | 11/2013 | Venkataraman et al. |
| 2014/0049551 A1 | 2/2014 | Rao et al. |
| 2015/0206272 A1 | 7/2015 | Perelygin et al. |
| 2015/0206277 A1 | 7/2015 | Rao et al. |
| 2016/0011857 A1 | 1/2016 | Grover et al. |
| 2016/0188251 A1 | 6/2016 | Dunning et al. |

OTHER PUBLICATIONS

Ueng, et al., "CUDA-Lite: Reducing GPU programming complexity." Journal (2008) vol. 5335; pp. 10-24. Springer-Verlag Berlin Heidelberg.

Cyrille Artho et al., "Using Block-Local Atomicity to Detect Stale-Value Concurrency Errors" [Online], 2004, pp. 150-164, [Retrieved from Internet on Aug. 8, 2016], <http://download.springer.com/static/pdf/613/chp%253A10.1007%252F978-3--540-30476-0.sub.-16.pdf>.

Butelle et al. "A Model for Coherent Distributed Memory for Race Condition Detection", 2011 IEEE, pp. 584-590.

"Higuera-Toledano "Towards an Analysis of Race Carrier Conditions in Real-time Java", "A Model for Coherent DistributedMemory for Race Condition Detection", 2006 IEEE, pp. 1-7.".

Sathiyamurthy et al. "Automated Reasoning Tool for the Detection of Race Conditions in Web Services", 2007 IEEE, pp. 61-65.

Tom Bergan et al., "CoreDet: A Compiler and Runtime System for Deterministic Multithreaded Execution", [Online], 2010, pp. 53-64, [Retrieved from Internet on Aug. 8, 2016], <http://delivery.acm.org/10.1145/1740000/1736029/p53-bergan.pdf>.

Milos Prvulovic, "CORD: Costeffective (and nearly overheadfree) OrderRecording and Data race detection", [Online], 2006, pp. 1-12, [Retreived from Internet on Aug. 8, 2016], <http://www.cc.gatech.edu/fac/milos/prvulovic.sub.--hpca06.pdf>.

Cormac Flanagan et al., "FastTrack: Efficient and Precise Dynamic Race Detection", [Online], 2010, pp. 93-101, [Retrieved from Internet on Aug. 8, 2016], http://delivery.acm.org/10.1145/1840000/1839699/p93-flanaga-n.pdf>.

* cited by examiner

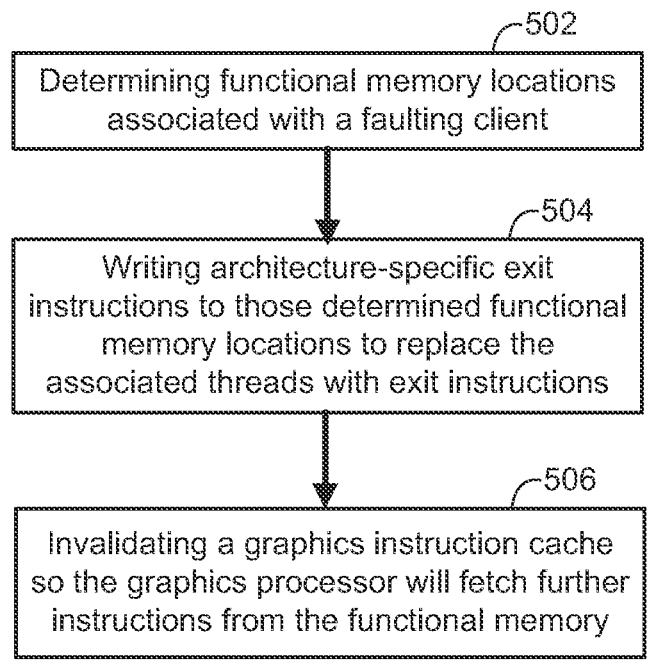

SELECTIVELY KILLING TRAPPED MULTI-PROCESS SERVICE CLIENTS SHARING THE SAME HARDWARE CONTEXT

CROSS REFERENCE TO RELATED APPLICATIONS

This application is a conversion of and claims priority to and the benefit of Provisional Patent Application No. 61/929,913, entitled "INLINE PARALLELISM AND RE-TARGETABLE PARALLEL ALGORITHMS" having a filing date of Jan. 21, 2014, naming Vinod Grover as the first named inventor, which is herein incorporated by reference in its entirety.

This application is also a conversion of and claims priority to and the benefit of Provisional Patent Application No. 61/929,496, entitled "UNIFIED MEMORY SYSTEMS AND METHODS" having a filing date of Jan. 20, 2014, naming Amit Rao as the first named inventor, which is herein incorporated by reference in its entirety.

This application is also a conversion of and claims priority to and the benefit of Provisional Patent Application No. 61/965,089, entitled "UNIFIED MEMORY SYSTEMS AND METHODS" having a filing date of Jan. 21, 2014, naming Amit Rao as the first named inventor, which is herein incorporated by reference in its entirety.

TECHNICAL FIELD

The present disclosure relates generally to the field of graphics processing units and more specifically to the field of multi-process services with a graphics processor unit.

BACKGROUND

A multi-process service (MPS) is an alternative, binary-compatible implementation of a parallel processing application programming interface (API). The MPS runtime architecture can be designed to transparently enable cooperative multi-process parallel-processing applications. For example, parallel programming kernels may be processed concurrently on the same graphics processing unit (GPU), allowing for better performance when the GPU's compute capacity is underutilized by a single application.

Parallel processing multi-process services allow multiple parallel processing processes to share a single GPU hardware context. This can be useful for applications that have very low occupancy (that is, they do not use up all the processing resources of the GPU), where multiple processes can help utilize the GPU better. However, because the hardware context is shared, there is no fault isolation, and so one faulting MPS client can cause all clients to be torn down.

SUMMARY OF THE INVENTION

Embodiments of this present invention provide solutions to the challenges inherent in handling faults when multiple parallel processes are sharing a single GPU hardware context. In a method according to one embodiment of the present invention, a method for selectively killing parallel processing clients is disclosed. The method comprises receiving a failure indication for at least one client running a thread in the graphics processor. Threads associated with the failing client that are in the graphics processor are determined. Threads in the graphics processor that are associated with the failing client are exited. Remaining threads in the graphics processor are continued for other clients running threads in the graphics processor.

In an apparatus according to one embodiment of the present invention, an exemplary multi-process service (MPS) server is operable to pass a plurality of threads from a plurality of clients to a graphics process for execution by the graphics processor. The MPS server is further operable, when notified by a failing client, to selectively kill just the failing client without disturbing the remaining clients continuing to execute threads on the graphics processor. In one embodiment, the MPS server is further operable to determine threads associated with the failing client and to exit those threads associated with the failing client and then to allow the remaining clients to continue executing their associated threads in the graphics processor.

In one embodiment, a method for handling parallel processing clients associated with a graphics processor is disclosed. The method comprises receiving a failure indication for at least one client of a plurality of clients running threads in the graphics processor. The method also comprises determining threads in the graphics processor associated with the failing client. Further, the method comprises exiting threads in the graphics processor associated with the failing client. Finally, the method comprises continuing to execute remaining threads in the graphics processor for other clients of the plurality of clients running threads in the graphics processor.

In another embodiment, a computer system is disclosed. The computer system comprises a graphics processor operable to execute threads. The system also comprises a plurality of client modules operable to generate threads for execution by the graphics processor. Further, the system comprises a server operable to manage threads from the plurality of client modules for parallel processing by the graphics processor, wherein the server is further operable to combine the threads from a plurality of client modules into a single collection of threads for execution by the graphics processor, wherein the server is further operable to execute a method for handling a failing client, the method comprising: (a) receiving a failure indication for at least one client of the plurality of clients running threads in the graphics processor; (b) determining threads in the graphics processor associated with the failing client; (c) exiting threads in the graphics processor associated with the failing client; and (d) continuing to execute remaining threads in the graphics processor for other clients of the plurality of clients running threads in the graphics processor.

Finally, in a different embodiment, another computer system is disclosed. The computer system comprises a graphics processor operable to execute threads and a plurality of client modules operable to generate threads for execution by the graphics processor. The system also comprises a server operable to manage threads from the plurality of client modules for parallel processing by the graphics processor, wherein the server is further operable to combine the threads from a plurality of client modules into a single collection of threads for execution by the graphics processor, wherein the server is further operable, upon receiving a failure indication from at least one of the clients running threads in the graphics processor, to determine threads in the graphics processor associated with the failing client, to exit threads in the graphics processor associated with the failing client, and to continue the execution of remaining threads in the graphics processor for other clients of the plurality of clients running threads in the graphics processor.

BRIEF DESCRIPTION OF THE DRAWINGS

Embodiments of the present invention will be better understood from the following detailed description, taken in conjunction with the accompanying drawing figures in which like reference characters designate like elements and in which:

FIG. 5 illustrates a flow diagram, illustrating computer executed steps to a method for exiting threads associated with a failing client from a graphics processor in accordance with an embodiment of the present invention.

DETAILED DESCRIPTION

Figure 1:
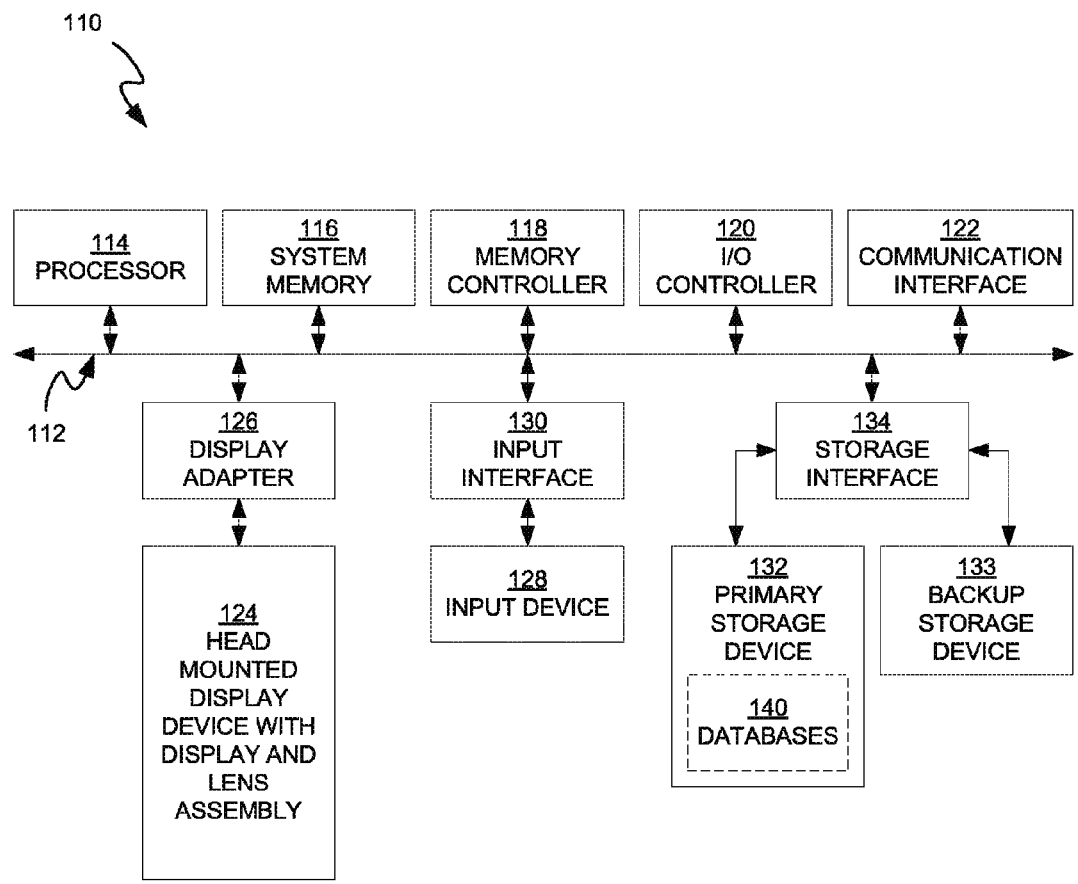
FIG. 1 is a block diagram of an example of a computing system 110 capable of implementing embodiments of the present disclosure.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail so as not to unnecessarily obscure aspects of the embodiments of the present invention. The drawings showing embodiments of the invention are semi-diagrammatic and not to scale and, particularly, some of the dimensions are for the clarity of presentation and are shown exaggerated in the drawing Figures. Similarly, although the views in the drawings for the ease of description generally show similar orientations, this depiction in the Figures is arbitrary for the most part. Generally, the invention can be operated in any orientation.

Notation and Nomenclature:

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "receiving," "determining," "exiting," "continuing," "determining," "writing," "invalidating," or the like, refer to the action and processes of a computer system, or similar electronic computing device, that manipulates and transforms data represented as physical (electronic) quantities within the computer system's registers and memories and other computer readable media into other data similarly represented as physical quantities within the computer system memories or registers or other such information storage, transmission or display devices. When a component appears in several embodiments, the use of the same reference numeral signifies that the component is the same component as illustrated in the original embodiment.

FIG. 1 is a block diagram of an example of a computing system 110 capable of implementing embodiments of the present disclosure. Computing system 110 broadly represents any single or multi-processor computing device or system capable of executing computer-readable instructions. Examples of computing system 110 include, without limitation, workstations, laptops, client-side terminals, servers, distributed computing systems, handheld devices, or any other computing system or device. In its most basic configuration, computing system 110 may include at least one processor 114 and a system memory 116.

Processor 114 generally represents any type or form of processing unit capable of processing data or interpreting and executing instructions. In certain embodiments, processor 114 may receive instructions from a software application or module. These instructions may cause processor 114 to perform the functions of one or more of the example embodiments described and/or illustrated herein.

System memory 116 generally represents any type or form of volatile or non-volatile storage device or medium capable of storing data and/or other computer-readable instructions. Examples of system memory 116 include, without limitation, RAM, ROM, flash memory, or any other suitable memory device. Although not required, in certain embodiments computing system 110 may include both a volatile memory unit (such as, for example, system memory 116) and a non-volatile storage device (such as, for example, primary storage device 132).

Computing system 110 may also include one or more components or elements in addition to processor 114 and system memory 116. For example, in the embodiment of FIG. 1, computing system 110 includes a memory controller 118, an input/output (I/O) controller 120, and a communication interface 122, each of which may be interconnected via a communication infrastructure 112. Communication infrastructure 112 generally represents any type or form of infrastructure capable of facilitating communication between one or more components of a computing device. Examples of communication infrastructure 112 include, without limitation, a communication bus (such as an Industry Standard Architecture (ISA), Peripheral Component Interconnect (PCI), PCI Express (PCIe), or similar bus) and a network.

Memory controller 118 generally represents any type or form of device capable of handling memory or data or controlling communication between one or more components of computing system 110. For example, memory controller 118 may control communication between processor 114, system memory 116, and I/O controller 120 via communication infrastructure 112.

I/O controller 120 generally represents any type or form of module capable of coordinating and/or controlling the input and output functions of a computing device. For example, I/O controller 120 may control or facilitate transfer of data between one or more elements of computing system 110, such as processor 114, system memory 116, communication interface 122, display adapter 126, input interface 130, and storage interface 134.

Communication interface 122 broadly represents any type or form of communication device or adapter capable of facilitating communication between example computing system 110 and one or more additional devices. For example, communication interface 122 may facilitate communication between computing system 110 and a private or public network including additional computing systems. Examples of communication interface 122 include, without limitation, a wired network interface (such as a network interface card), a wireless network interface (such as a wireless network interface card), a modem, and any other suitable interface. In one embodiment, communication interface 122 provides a direct connection to a remote server via a direct link to a network, such as the Internet. Communication interface 122 may also indirectly provide such a connection through any other suitable connection.

Communication interface 122 may also represent a host adapter configured to facilitate communication between computing system 110 and one or more additional network or storage devices via an external bus or communications channel. Examples of host adapters include, without limitation, Small Computer System Interface (SCSI) host adapters, Universal Serial Bus (USB) host adapters, IEEE (Institute of Electrical and Electronics Engineers) 1394 host adapters, Serial Advanced Technology Attachment (SATA) and External SATA (eSATA) host adapters, Advanced Technology Attachment (ATA) and Parallel ATA (PATA) host adapters, Fibre Channel interface adapters, Ethernet adapters, or the like. Communication interface 122 may also allow computing system 110 to engage in distributed or remote computing. For example, communication interface 122 may receive instructions from a remote device or send instructions to a remote device for execution.

As illustrated in FIG. 1, computing system 110 may also include at least one display device 124 coupled to communication infrastructure 112 via a display adapter 126. Display device 124 generally represents any type or form of device capable of visually displaying information forwarded by display adapter 126. Similarly, display adapter 126 generally represents any type or form of device configured to forward graphics, text, and other data for display on display device 124.

As illustrated in FIG. 1, computing system 110 may also include at least one input device 128 coupled to communication infrastructure 112 via an input interface 130. Input device 128 generally represents any type or form of input device capable of providing input, either computer- or human-generated, to computing system 110. Examples of input device 128 include, without limitation, a keyboard, a pointing device, a speech recognition device, or any other input device.

As illustrated in FIG. 1, computing system 110 may also include a primary storage device 132 and a backup storage device 133 coupled to communication infrastructure 112 via a storage interface 134. Storage devices 132 and 133 generally represent any type or form of storage device or medium capable of storing data and/or other computer-readable instructions. For example, storage devices 132 and 133 may be a magnetic disk drive (e.g., a so-called hard drive), a floppy disk drive, a magnetic tape drive, an optical disk drive, a flash drive, or the like. Storage interface 134 generally represents any type or form of interface or device for transferring data between storage devices 132 and 133 and other components of computing system 110.

In one example, databases 140 may be stored in primary storage device 132. Databases 140 may represent portions of a single database or computing device or it may represent multiple databases or computing devices. For example, databases 140 may represent (be stored on) a portion of computing system 110 and/or portions of example network architecture 200 in FIG. 2 (below). Alternatively, databases 140 may represent (be stored on) one or more physically separate devices capable of being accessed by a computing device, such as computing system 110 and/or portions of network architecture 200.

Continuing with reference to FIG. 1, storage devices 132 and 133 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 132 and 133 may also include other similar structures or devices for allowing computer software, data, or other computer-readable instructions to be loaded into computing system 110. For example, storage devices 132 and 133 may be configured to read and write software, data, or other computer-readable information. Storage devices 132 and 133 may also be a part of computing system 110 or may be separate devices accessed through other interface systems.

Many other devices or subsystems may be connected to computing system 110. Conversely, all of the components and devices illustrated in FIG. 1 need not be present to practice the embodiments described herein. The devices and subsystems referenced above may also be interconnected in different ways from that shown in FIG. 1. Computing system 110 may also employ any number of software, firmware, and/or hardware configurations. For example, the example embodiments disclosed herein may be encoded as a computer program (also referred to as computer software, software applications, computer-readable instructions, or computer control logic) on a computer-readable medium.

The computer-readable medium containing the computer program may be loaded into computing system 110. All or a portion of the computer program stored on the computer-readable medium may then be stored in system memory 116 and/or various portions of storage devices 132 and 133. When executed by processor 114, a computer program loaded into computing system 110 may cause processor 114 to perform and/or be a means for performing the functions of the example embodiments described and/or illustrated herein. Additionally or alternatively, the example embodiments described and/or illustrated herein may be implemented in firmware and/or hardware.

For example, a computer program for implementing the method for handling parallel processing clients associated with a server in a GPU in accordance with embodiments of the present invention may be stored on the computer-readable medium and then stored in system memory 116 and/or various portions of storage devices 132 and 133. When executed by the processor 114, the computer program may cause the processor 114 to perform and/or be a means for performing the functions required for carrying out the method for handling parallel processing clients associated with a server in a GPU discussed in further detail below.

Figure 2:
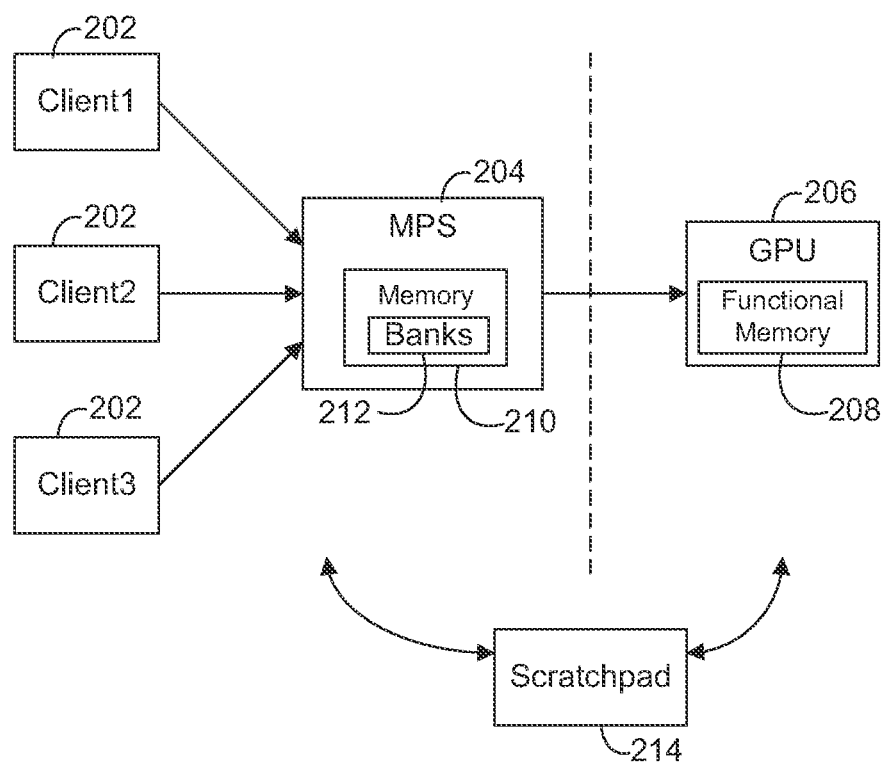
FIG. 2 illustrates a block diagram of an exemplary multi-process service server interfacing with a graphics processor in accordance with an embodiment of the present invention.

Selectively Killing Trapped Multi-Process Service Clients Sharing the Same Hardware Context:

Embodiments of this present invention provide solutions to the challenges inherent in handling faults when multiple processes or clients are sharing a single GPU hardware context. Embodiments of the present invention disclose a method providing a process for selectively killing parallel processing clients. FIG. 2 illustrates a block diagram of an exemplary multi-process service server interfacing with a graphics processor in accordance with an embodiment of the present invention.

In one embodiment, as illustrated in FIG. 2, when threads of a particular client 202 have faulted and stalled in a graphics processing unit (GPU) 206, an exemplary MPS server 204 is operable to selectively kill the effected failing or faulting client 202 without having to also kill all the other unfailing clients 202 (and their currently running threads) as well.

In response to a system event, such as: a GPU generated interrupt, an MPS client initiated action, or an MPS server initiated action in the response to the sudden termination of a client, the MPS server 204 may stop the GPU 206. When the GPU 206 is stopped, threads executing on the GPU 206 are halted. In one embodiment, the currently running GPU hardware context is maintained without any changes. The MPS server 204 examines each of the clients' states, notifies the appropriate clients 202, and in the case of a GPU interrupt, waits for a response on how to handle this event. In one embodiment, in the case of a non-fatal exception, the MPS server 204 may attempt to resume the GPU 206, but since there could be corrupted code following the assert (and the reason for the assert in the first place), the MPS server 204 may "kill" the MPS clients 202 causing the assert. In one exemplary embodiment, as discussed herein, an MPS client 202 is "killed" by identifying all the threads associated with the failing MPS client 202 that are being executed by the graphics processor 206 and exiting each of the associated threads.

To implement this selective killing of MPS clients 202, the MPS server 204 first determines all the portions of function memory 208 belonging to that client 202. As illustrated in FIG. 2, function memory 208 is located on the GPU 206 and contains the code (e.g., threads) to be executed by the GPU 206, for that client 202. This is information that the MPS server 204 keeps track of for each allocation for each client 202, and therefore can quickly determine to whom the portions of memory 208 belong. The MPS server 204 may then write architecture-specific EXIT instructions to those memory locations within the functional memory 208 to completely replace the client's code with EXITs. Finally, the MPS server 204 invalidates the GPUs instruction cache, so that the GPU 206 will then fetch further instructions from the functional memory 208. Both steps are needed so that regardless at what point the client's work on the GPU 206 stopped, when that work is resumed, any of the client's 202 outstanding work will hit the EXIT instructions and leave the GPU 206.

In one embodiment, an exemplary multi-process system (comprising the MPS server 206 and the MPS clients 202) is a mechanism that allows multiple applications or clients to simultaneously share the GPU 206. The multi-process system does this without any form of fault isolation or memory isolation. Therefore, as far as the GPU 206 is concerned, all the threads running from any number of clients 202 will be considered as coming from a single client 202. As illustrated in FIG. 2, the multi-process system is a client 202/server 204 architecture. This allows the GPU 206 to be fully utilized, since many of the applications/clients 202 will not fill up the GPU 206 on their own. However, because each application/client 202 may have its own hardware context, the GPU 206 is not able to run them all simultaneously. To get around this, the multi-process system utilizes a server 204 and client 202 architecture, where the clients 202 talk to the server 204, and the server 204 creates a single hardware context for all of the clients 202. Therefore, the clients 202 may channel their work (e.g., threads for execution in the GPU 206) through the server 204 via a single hardware context that incorporates all of the hardware specifications for each client 202 into a single, combined hardware context. The MPS server 204 creates a hardware context that allows any client 202 to channel threads through the MPS server 204 to the GPU 206. In one embodiment, the MPS server 204 may create a single hardware context that includes all possible considerations for any of the clients 202 of the MPS server 204. This exemplary generic hardware context may be a superset of anything the clients 202 may need to run on the GPU 206.

However, as discussed herein, faults are not isolated. So if a client 202 launches a thread that causes a problem, all of the threads from all of the current clients 202 would need to be terminated under conventional procedures. In exemplary embodiments of the present invention, a trapped client 202 (with faulting threads in the GPU 206) may be killed without disrupting any other clients 202 with other threads also running in the GPU 206. In one embodiment a trap is a thread on the GPU 206 hitting a particular instruction or in response to a particular instruction that notifies a central processing unit (CPU) that an error is present. This is a general mechanism in GPUs 206. As discussed herein, these notifications coming from the GPU 206 are handled by the MPS server 204. If certain clients 202 are determined to have faulted, those clients 202 that are causing error(s) need to be individually killed, and without tearing down all of the processes or threads currently running through the MPS server 204 and GPU 206. Such faults or error conditions may vary depending on how the application or client 202 is programmed.

In one embodiment, there may be a device-side trap handler that may be initiated by a user-side, causing the GPU 206 to save its state, run a notification to the host, and then wait. Once the CPU has received this notification, the CPU may respond to the GPU 206 telling it to resume execution or some other response. The GPU 206 can then be told to continue. If this mode was entered because of an error, the GPU 206 may save its state, send the notification to the host/CPU and when the CPU tells the GPU to continue, the GPU 206 will terminate the faulting thread. In either of these conditions, all of the threads identified as being associated with the faulting client(s) 202 are exited, while those threads associated with the remaining clients 202 are allowed to remain and continue running.

Figure 3:
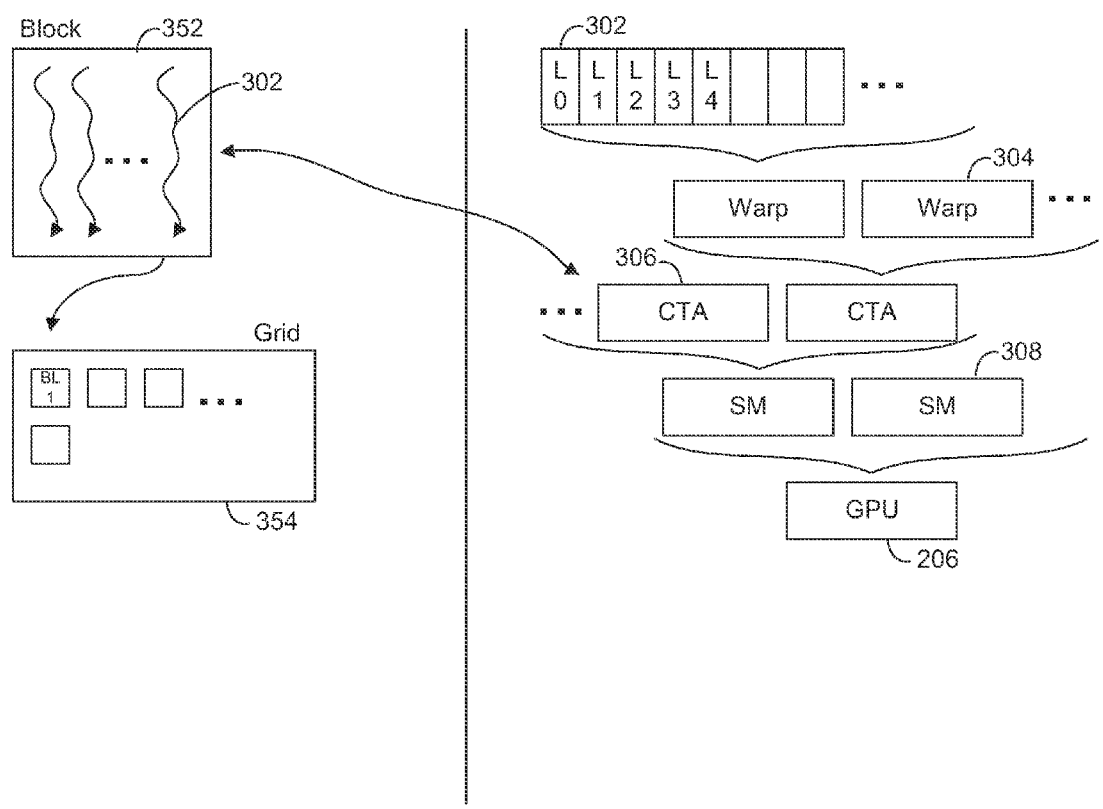
FIG. 3 illustrates a block diagram of an exemplary arrangement of threads from a plurality of clients for execution in a graphics processor in accordance with an embodiment of the present invention.

Determining Thread/Client Associations:

FIG. 3 illustrates a block diagram of an exemplary arrangement of threads from a plurality of clients for execution in a graphics processor in accordance with an embodiment of the present invention. As illustrated in FIG. 3, all of the threads 302 executed by the GPU are grouped into warps 304. That is, the GPU 206 executes the threads 302 in groups called warps 304. In one embodiment, these threads 302 may be contained in lanes (L0-Ln). These groups of threads 302 are further grouped into a thread block or a cooperative thread array (CTA) 306, and the CTAs 306 are executed on a streaming multiprocessor (SM) 308. These components are the basic "building blocks" of the GPU 206. When any of the threads 302 in an SM 308 hits an exception and goes off into a trap handler, all of the threads 302 in the SM 308 are also stopped. In one embodiment, there may be many different MPS clients 202 with threads 302 in the particular SM 308 with a faulting thread 302. Each of the CTAs 306 that are executing could be coming from a different MPS client 202. There may be 10s of them in a single SM 308.

Therefore, as illustrated in FIG. 3, there are two different ways to view threads 302 in graphics processor programming. As illustrated in FIG. 3, a plurality of threads 302 may be grouped into a block 352. A plurality of blocks 352 may be grouped into a grid 354. The exemplary block 352 and the grid 354 allow a three-dimensional representation of the threads 302, while the exemplary lanes (L0-Ln) of threads 302, warps 304, CTAs 306, and SMs 308 are single dimensional. Each warp 304 contains a group of lanes of threads 302. A fixed quantity of lanes of threads 302 may be grouped into a warp 304. In one embodiment, a particular fixed quantity of lanes of threads 302 may be in accordance with the hardware. There are groups of warps 304 called CTAs 306. As illustrated in FIG. 3, an exemplary CTA 306 may be logically equivalent to a block 352. A CTA 306 is a group of threads 302 that is running. The difference between the threads 302 in a block 352 and the lanes (L0-Ln) of threads 302 in a CTA 306 is that the threads 302 in a block 352 are three dimensional, while the lanes (L0-Ln) of threads 302 are linearized on the hardware.

Groups of CTAs 306 execute on an SM 308. An exemplary SM 308 is a construct that may contain a number of CTAs 306. For example, an exemplary SM 308 may contain ten CTAs 306, where each of the CTAs 306 contains a block 352 of threads 302 from a different MPS client 202. Therefore, the block/grid 352/354 provides a logical representation, while the warps (L0-Ln) of threads 302, CTA 306, and SM 308 of the GPU 206 is a hardware representation, and a way that the threads 302 actually run on the hardware (e.g., the GPU 206). From a user's perspective, the threads 302 are in a block 352/grid 354 arrangement, but from a library perspective (to access the threads 302 associated with faulting client(s) 202), the hardware perspective is needed.

When a fault has been received, the MPS server 204 looks at the hardware coordinates to determine its state. An exemplary MPS server 204 may take these values and build mappings back into what the logical coordinates were. Therefore, this will allow the system to determine what was running from the user's perspective.

As discussed herein, there are exemplary ways for a GPU 206 to determine the logical coordinates of the threads 302 when a trap event or GPU exception is encountered. For example, the threads for a given client 202 may be grouped into a separate block 352 or CTA 306, but more than one client's threads 302 or CTAs 306 may be found in an SM 308. Under exemplary multi-process services, multiple CTAs 306 from different MPS clients 202 may occupy the GPU 206 at the same time, by pretending that they all belong to a single client 202. Because a given CTA 306 or block 352 is reserved for a given client 202, when a trap event or exception is received, the block 352 or CTA 306 of the faulting threads 302 is determined to identify the faulting client 202 so that the faulting client 202 with the faulting thread(s) 302 may be killed.

For example, as illustrated in FIG. 2, a plurality of clients 202 (Client1, Client2, Client3) are talking through the MPS server 204 to the GPU 206. So as far as the GPU 206 is concerned, only the MPS server 204 exists. However, the MPS server 204 is able to disambiguate the threads 302 to the different clients 202 and figure how to correlate back to the clients 202 when a fault is received.

In one exemplary embodiment, as illustrated in FIG. 2, there is a memory module 210 comprising a plurality of banks 212. Each exemplary bank 212 is a portion of the memory 210 that holds data that varies based on the grids 354 that are pushed to it. As illustrated in FIG. 2, a bank 212 is associated with each grid 354. In one embodiment, a bank 212 of the memory module 210 may be looked up for a particular grid 354. In other words, each grid 354 is allotted its own particular bank 212 in the memory module 210 (bound to a particular address in hardware). The hardware can look up each grid 354 by looking at a particular address in the memory module 210 and reading a particular offset for a particular bank 212. In one embodiment, an allocation that backs this bank 212 (that actually performs the allocation) is a user mode driver (that is in charge of marshaling work onto and off of the GPU 206. It will make this allocation of the bank(s) 212 of the memory module 210.

When clients 202 are created under the multi-process service, each client 202 is assigned a client ID. Each client 202 has a client ID, and within each client 202, for each grid 354, there is a grid ID. For each unique launch of work there will be a grid ID for the work. Therefore, each client ID will be unique to the MPS server 204, while the grid ID exists even without a multi-process service. A guarantee is that the grid ID is a unique ID, so that if the work is launched a second time, two grids 354 that are otherwise identical will vary in grid ID. Grid ID may therefore be a unique identifier to identify a particular instance of time when work was presented to the GPU 206. The client ID will be unique to the process while a client 202 is talking to the MPS server 204. If the same process (client) 202 wants to run again, the client ID may be used again. A client ID is unique for each of the clients 202 currently connected to the MPS server 204. Each client ID is unique for the MPS server 204, but it is not unique over time. In other words, if a client 202 appears in the MPS server 204, disconnects from the MPS server 204 and then reconnects to the MPS server 204, the client 202 might get the same client ID again. But from the point of view of the MPS server 204, given a client ID, the MPS server 204 can identify a client 202 that is connected to it.

In one embodiment, a client ID is established by the MPS server 202 as part of an initial handshake protocol with the requesting client 202 and is communicated back to the client 202. Therefore, both the client 202 and the MPS server 204 are aware of the client ID for that particular client 202. When work is being pushed from the client 202, the client 202 is in charge of determining what sort of work is being pushed, how to push it, and how to set up the hardware so it will linearize these three dimensional coordinates down to one dimensional coordinates. Therefore, a client 202 makes these bank 212 allocations in the memory module 210 that are unique for every launch, (a launch is shorthand for when work is pushed onto the GPU 206). For every launch, the particular client 202 is in charge of figuring out how to push the launch. While a client 202 is doing these bank 212 allocations at a particular offset within the bank, the client 202 will write out the client ID. The grid ID is also written out into a particular offset and is also written to that particular offset. So these also get written into the constant bank for a particular launch.

In one embodiment, when work is running on a GPU 206 and an exception is received, the GPU 206 will vector off into instructions that are run on the GPU 206 before the GPU 206 notifies the CPU that an exception has been received. These instructions are part of the trap handler and will write out state information into a piece of global memory 214 that can be read by the MPS server 204 and all of the clients 202. This memory 214 is placed into zero copy memory (also known as host memory) so that it can be directly de-referenced. It is shared by OS shared memory, so that this piece of global memory 214 may be read by any client 202 or the MPS server 204. This piece of global memory 214 may also be mapped into the GPU's 206 address space. This piece of memory 214, as illustrated in FIG. 2, may also be known as a scratchpad.

In one exemplary embodiment, the scratchpad 214 is sufficient to contain all of the work that can be potentially resident on the GPU 206 simultaneously, has a fixed offset in which the scratchpad 214 may write state information about itself (all state information that is relevant is written to the scratchpad 214). Many of the states with respect to lanes (L0-Ln) about lanes (L0-Ln) may be common and may be condensed if desired. In other words, the scratchpad 214 is sufficient to contain state information about all of the processes that could potentially be resident on the GPU 206 simultaneously.

The scratchpad 214 has within it a slot in which every lane (L0-Ln) can write out its client ID. When the trap handler is vectored into, every lane (L0-Ln) writes out its state information, writes out information about its client ID, grid ID, and once this information has been written out, the process will continue until the CPU is notified that the GPU 206 has hit an error or exception condition.

Once the CPU wakes up it examines the state information that was stored in the scratchpad 214. Because the scratchpad 214 is in host memory, the CPU can directly dereference the information. All of the lanes (L0-Ln) that were present on the GPU 206 are examined by the CPU and a table may be built specifying which clients 202 are present and for which lanes (L0-Ln)/warps 304. The MPS server 206 will then notify each client 202 in order and allow each of them to complete so that there will be no races between the clients 202. The MPS server 204 tells the client(s) 202 what the action should be. When the client 202 is presented with this state information, the client 202 filters out the state information for all the other clients 202 in the system and takes the state information for all the threads 302 in the GPU 206 that correspond to only itself and examines those threads 302 based on what else the client 202 knows.

For example, in the case of a particular thread 302 on the GPU 206 hitting an assertion (part of the assertion writes out in global memory, e.g., scratchpad 214 why this particular thread 302/warp 304 has hit this particular exception). This state information (in this portion of global memory) is also visible to this client 202 and the GPU 206. The MPS server 204 is not aware of this portion of global memory. The MPS server 204 is aware that a particular thread 302 has hit a particular exception, is aware that the thread 302 belongs to that particular client 202, and it is aware that the GPU 206 has notified the CPU that something has happened. The MPS server 204 notifies the client 202 and the client 202 examines only those threads 302 that belong to it and decides. The client 202 knows that a particular thread 302 has caused an exception and the client 202 knows that a particular portion of global memory holds state information related to this exception. The client 202 reads this portion of global memory and decides that the thread 302 has hit an assertion (e.g., that an exception has occurred and the process should stop.).

In one embodiment, the MPS server 204 is aware of the size and type of memory allocation, so certain allocations contain instruction/function memory. Therefore, the MPS server 204 is aware that certain portions of the allocated memory contain functional memory 208. At this point, the MPS server 204 has been told by the client 202 that the work belonging to this client 202 must be stopped (also known as killed). As discussed herein, the MPS server 204 builds a list of all the function memory 208 that belongs to this client 202 and loads up the required encoding for exiting from the GPU 206. The MPS server 204 writes exits to all of the instruction/function memory 208 that belonged to this client 202.

The way the memory is isolated, each of these clients 202 has a separate portion of instruction/function memory 208. When an allocation of instruction/function memory 208 is made, each allocation is unique to each client 202. So all of the memory regions that belong to the particular client 202 that needs to be killed are filled with "exit" instructions. The MPS server 204 will then resume the GPU 206 and the GPU 206 will make progress, complete the functioning of the trap handler, return to the place where the exception occurred, and since the instructions there are to exit, all of the threads 302 that belong to this client 202 will be exited. All of these threads 302 will see an exit instruction and will end. All of the work that is also in the process of being launched from the faulting client 202 will be locked out. The MPS server 204 will wait for all the work for this particular client 202 to exit the GPU 206 and will not let the client 202 launch any new work. The MPS server 204 will also work to ensure that any work that was being converted from three dimensional to one dimensional, or had not yet appeared in the hardware will successfully finish. The MPS server 204 will remove the killed client 202 from the list of clients 202. This allows a bit of a delay to make sure that all activities related to the failing client 202 are finished and will not enter the GPU 206. This allows the MPS server 204 to individually kill clients 202 without having to kill all of the clients 202 also associated with the MPS server 204 and currently running threads 302 in the GPU 206.

Additional Considerations and Constraints:

When setting up the function memory 208 and setting exits into the function memory 208, this has to be done in a way that the GPU 206 will be able to process it. The problem is that the threads 302 are currently at a breakpoint. The SM 308 cannot make any further process to write those exits. So another asynchronous copy engine needs to be used to make the entry into the instruction/function memory 208 to write the exit instructions. The instruction cache also needs to be invalidated. This ensures that old cache copies of the failed client 202 are not left around to cause problems later. There are some faults that are chip wide and would still require all clients 202 to be killed to deal with them. Therefore, when a fault cannot be attributed to a particular client 202 or group of clients 202, all of the clients 202 will have to be killed. The tools may also be used to handle the states and what the clients 202 see, and how the clients 202 will handle the error. The tools can put breakpoints into the instructions and determine how the client 202 will deal with it.

Each client 202 is able to independently determine how to handle a problem with itself and how to stop without having to deal with any other client 202. However, a client 202 is able to decide if a particular error that is fatal to itself is also fatal to other clients 202. There are circumstances when more than one client 202 is dependent upon other clients 202 and when a client fails 202, all the associated clients 202 also need to be killed to handle the exception.

Figure 4:
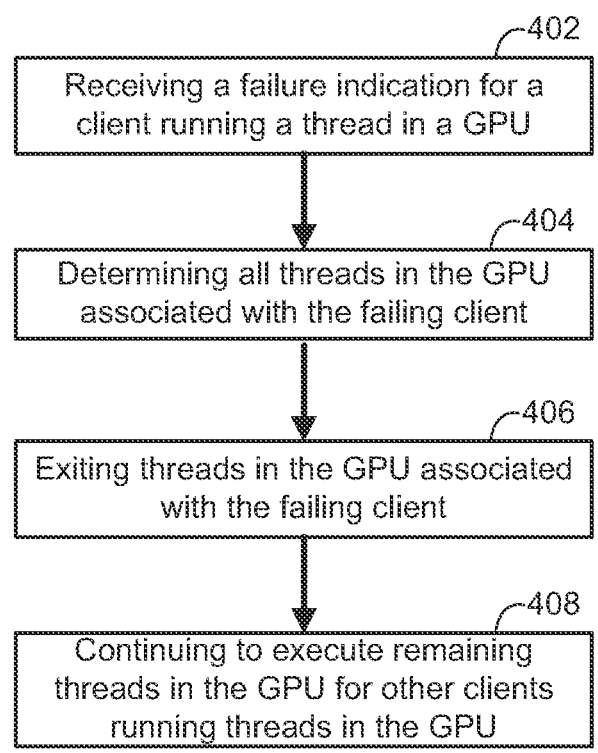
FIG. 4 illustrates a flow diagram, illustrating computer executed steps to a method for handling failing clients with their associated threads executing in a graphics processor in accordance with an embodiment of the present invention.

FIG. 4 illustrates exemplary computer-executed steps of a method for managing clients 202 running threads 302 on a GPU 206. In step 402 of FIG. 3, a failure indication is received for a particular client 202 or clients 202 running one or more threads in the GPU 206. In step 404 of FIG. 4, all threads in the GPU 206 associated with the failing client(s) 202 are determined.

In step 406 of FIG. 4, all threads in the GPU 206 associated with the failing client 202 are exited. Finally, in step 408 of FIG. 4, the remaining threads in the GPU 206 are continued for all other clients 202 still running threads 302 in the GPU 206.

FIG. 5 illustrates exemplary computer-executed steps of a method for identifying and killing threads 302 associated with a faulting client 202 running threads in a GPU 206. In step 502 of FIG. 5, functional memory locations 208 for a faulting client 202 are determined. In step 504 of FIG. 5, architecture-specific exit instructions are written to those determined functional memory locations to replace the associated threads 302 with exit instructions. Finally, in step 506 of FIG. 5, a graphics instruction cache is invalidated so that the graphics processor will fetch further instructions from the functional memory that contains the exit instructions.

Although certain preferred embodiments and methods have been disclosed herein, it will be apparent from the foregoing disclosure to those skilled in the art that variations and modifications of such embodiments and methods may be made without departing from the spirit and scope of the invention. It is intended that the invention shall be limited only to the extent required by the appended claims and the rules and principles of applicable law.

What is claimed is:

1. A method for handling parallel processing clients associated with a graphics processor, the method comprising:
   receiving a failure indication for at least one client of a plurality of clients running threads in the graphics processor;
   determining threads and functional memory locations in the graphics processor associated with the failing client, wherein the functional memory comprises threads to be executed by the graphics processor for the failing client;
   exiting threads in the graphics processor associated with the failing client, wherein the exiting comprises writing architecture-specific exit instructions to functional memory locations and the exit instructions are made visible so that the graphics processor fetches the exit instructions from the functional memory; and
   continuing to execute remaining threads in the graphics processor for other clients of the plurality of clients running threads in the graphics processor.

2. The method of claim 1, wherein determining threads in the graphics processor associated with the failing client comprises building mappings to the logical coordinates of the threads to determine what threads of the failing client were running.

3. The method of claim 1, wherein the threads for each client are separately grouped according to client, such that once a failing thread has been identified, the remaining threads associated with that client are also identified and may be discontinued.

4. The method of claim 1, wherein the plurality of clients executing threads in the graphics processor share a single graphics processor hardware context.

5. The method of claim 1, wherein the failure indication comprises one of:
   a graphics processor generated interrupt;
   a client initiated action; and
   a server initiated action in response to a termination of a client, wherein the server manages the plurality of clients executing threads on the graphics processor.

6. The method of claim 1, wherein exiting threads in the graphics processor associated with the failing client comprises halting the graphics processor until the threads associated with the failing client have been exited, and wherein halting the graphics processor comprises halting threads executing in the graphics processor.

7. The method of claim 1, wherein after exiting threads associated with the failing client, the same graphics processor hardware context is still used.

8. The method of claim 1, wherein the exiting threads in the graphics processor associated with the failing client further comprises
   invalidating a graphics instruction cache so that the graphics processor will fetch further instructions from the functional memory.

9. A computer system comprising:
   a graphics processor operable to execute threads;
   a plurality of clients operable to generate threads for execution by the graphics processor; and
   a server operable to manage threads from the plurality of clients for parallel processing by the graphics processor, wherein the server is further operable to combine the threads from a plurality of clients into a single collection of threads for execution by the graphics processor, wherein the server is further operable to execute a method for handling a failing client, the method comprising:
      receiving a failure indication for at least one client of the plurality of clients running threads in the graphics processor;
      determining threads and functional memory locations in the graphics processor associated with the failing client, wherein the functional memory comprises threads to be executed by the graphics processor for the failing client;
      exiting threads in the graphics processor associated with the failing client, wherein the exiting comprises writing architecture-specific exit instructions to functional memory locations and the exit instructions are made visible so that the graphics processor fetches the exit instructions from the functional memory; and
      continuing to execute remaining threads in the graphics processor for other clients of the plurality of clients running threads in the graphics processor.

10. The computer system of claim 9, wherein determining threads in the graphics processor associated with the failing client comprises building mappings to the logical coordinates of the threads to determine what threads of the failing client were running.

11. The computer system of claim 9, wherein the threads for each client are separately grouped according to client, such that once a failing thread has been identified, the remaining threads associated with that client are also identified and may be discontinued.

12. The computer system of claim 9, wherein the plurality of clients executing threads in the graphics processor share a single graphics processor hardware context.

13. The computer system of claim 9, wherein the failure indication comprises one of:
   a graphics processor generated interrupt;
   a client initiated action; and
   a server initiated action in response to a termination of a client, wherein the server manages the plurality of clients executing threads on the graphics processor.

14. The computer system of claim 9, wherein exiting threads in the graphics processor associated with the failing client comprises halting the graphics processor until the threads associated with the failing client have been exited, and wherein halting the graphics processor comprises halting threads executing in the graphics processor.

15. The computer system of claim 9, wherein after exiting threads associated with the failing client, the same graphics processor hardware context is still used.

16. The computer system of claim 9, wherein the exiting threads in the graphics processor associated with the failing client further comprises
   invalidating a graphics instruction cache so that the graphics processor will fetch further instructions from the functional memory.

17. A computer system comprising:
   a graphics processor operable to execute threads;
   a plurality of clients operable to generate threads for execution by the graphics processor; and
   a server operable to manage threads from the plurality of clients for parallel processing by the graphics processor, wherein the server is further operable to combine the threads from a plurality of clients into a single collection of threads for execution by the graphics processor, wherein the server is further operable, upon receiving a failure indication from at least one of the clients running threads in the graphics processor to:
   determine threads and functional memory locations in the graphics processor associated with the failing client, wherein the functional memory comprises threads to be executed by the graphics processor for the failing client,
   exit threads in the graphics processor associated with the failing client, wherein the exiting comprises writing architecture-specific exit instructions to functional memory locations and the exit instructions are made visible so that the graphics processor fetches the exit instructions from the functional memory, and
   continue the execution of remaining threads in the graphics processor for other clients of the plurality of clients running threads in the graphics processor.

18. The computer system of claim 17, wherein the plurality of clients executing threads in the graphics processor share a single graphics processor hardware context.

19. The computer system of claim 17, wherein the failure indication comprises one of:
   a client initiated action; and
   a server initiated action in response to a termination of a client, wherein the server manages the plurality of clients executing threads on the graphics processor.

20. The computer system of claim 17, wherein the server is further operable to halt the graphics processor until the threads associated with the failing client have been exited, wherein halting the graphics processor halts threads executing in the graphics processor.

21. The computer system of claim 17, wherein after exiting threads associated with the failing client, the same graphics processor hardware context is still used.

22. The computer system of claim 17, wherein the server is further operable to execute the following steps to exit threads in the graphics processor associated with the failing client
   and
   invalidating a graphics instruction cache so that the graphics processor will fetch further instructions from the functional memory.

* * * * *